United States Patent
Bheda

(10) Patent No.: US 10,569,474 B2
(45) Date of Patent: Feb. 25, 2020

(54) FREE-SPACE 3D PRINTER

(71) Applicant: Arevo, Inc., Milpitas, CA (US)

(72) Inventor: Hemant Bheda, Saratoga, CA (US)

(73) Assignee: Arevo, Inc., Milpitas, CA (US)

( * ) Notice: Subject to any disclaimer, the term of this patent is extended or adjusted under 35 U.S.C. 154(b) by 0 days.

(21) Appl. No.: 15/866,282

(22) Filed: Jan. 9, 2018

(65) Prior Publication Data

US 2019/0210293 A1   Jul. 11, 2019

(51) Int. Cl.
| | | |
|---|---|---|
| *B29C 64/40* | (2017.01) | |
| *B29C 64/118* | (2017.01) | |
| *B29C 64/245* | (2017.01) | |
| *B29C 64/165* | (2017.01) | |
| *B33Y 10/00* | (2015.01) | |
| *B33Y 30/00* | (2015.01) | |
| *B29K 101/12* | (2006.01) | |

(52) U.S. Cl.
CPC ........... *B29C 64/40* (2017.08); *B29C 64/118* (2017.08); *B29C 64/165* (2017.08); *B29C 64/245* (2017.08); *B33Y 10/00* (2014.12); *B33Y 30/00* (2014.12); *B29K 2101/12* (2013.01)

(58) Field of Classification Search
CPC ....... B29C 64/40; B29C 64/165; B29C 70/00; B29C 70/56; B33Y 30/00; B29K 2101/12
USPC .......................................... 425/375; 138/176
See application file for complete search history.

(56) References Cited

U.S. PATENT DOCUMENTS

| | | | |
|---|---|---|---|
| 3,111,965 A * | 11/1963 | Hodge | B28B 21/66 138/176 |
| 8,700,160 B2 | 4/2014 | Troosters et al. | |
| 9,422,650 B2 | 8/2016 | Simpson | |
| 2014/0232035 A1 | 8/2014 | Bheda | |

FOREIGN PATENT DOCUMENTS

WO  WO-2009115172 A1 *  9/2009  ........... B29C 53/585

OTHER PUBLICATIONS

WO2009115172A1-MT (Year: 2009).*
Madox, "Yippee 2—Hyperboloid Stool (Preview)", Perverse Applications of Science . . . , WTF Jul. 11, 2010.
Hyperboloid: Ruled: Made by Mike's Math Stuff, https://www.shapeways.com/product/VJB3H88WR/hyperboloid-ruled?optionId=60293837&li=marketplace, Jan. 2018.
PCT "Invitation to Pay Additional Fees with Partial International Search," International Application No. PCT/US2019/012215, dated Apr. 5, 2019.

(Continued)

*Primary Examiner* — Matthew J Daniels
*Assistant Examiner* — Yunju Kim
(74) *Attorney, Agent, or Firm* — McGeary Cukor LLC; Jason Paul DeMont; Kenneth Ottesen

(57) ABSTRACT

A technique for additive manufacturing that avoids the necessity of having a build plate. The illustrative embodiment comprises two anchor plates from which a structure is constructed that forms at least the initial support for the object to be manufactured. The envelope of the structure can be a cylinder, a box, an n-sided prism, a hyperboloid of one sheet, a cone, the frustum of a cone, a pyramid, and the frustum of a pyramid.

10 Claims, 17 Drawing Sheets

(56) References Cited

OTHER PUBLICATIONS

John Biehler: "3D printing an hyperboloid", Jul. 19, 2011 (Jul. 19, 2011), Retrieved from the Internet: URL: johnbiehler.com/2011/07/19/3d-printing-a-hyperboloid/ [retrieved on Mar. 19, 2019].
Officer Nalhalie Pierre, Written Opinion of ISA, International Application No. PCT/US2019/012215, dated Jul. 12, 2019.
Officer Nalhalie Pierre, International Search Report, International Application No. PCT/US2019/012215, dated Jul. 12, 2019.

* cited by examiner

3D Printing System 100
(orthographic side view)

Cylindrical Filament Nest 150-A

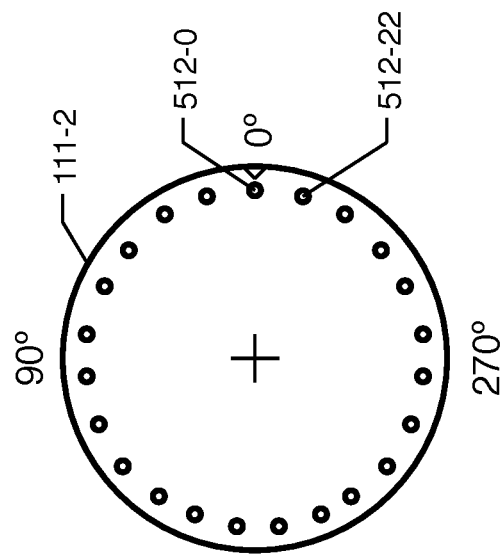
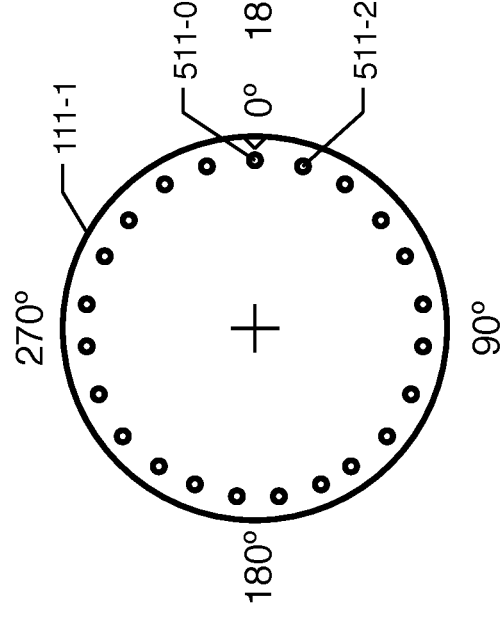
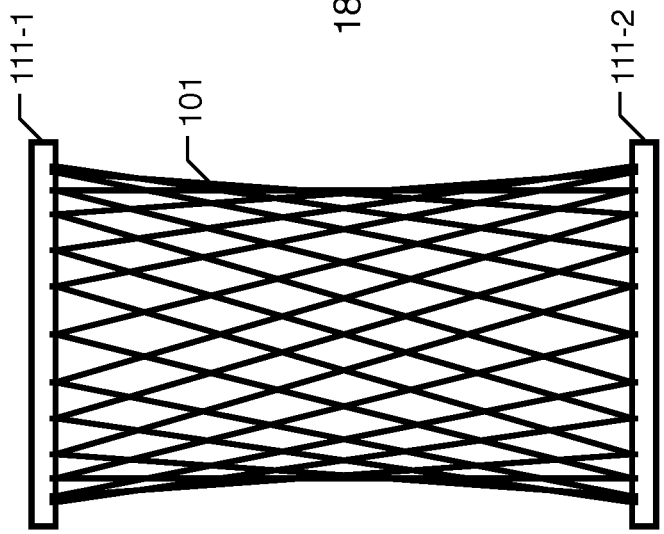
Symmetric Hyperboloid (One Sheet) Filament Nest 150-B
Figure 5a
Figure 5b
Figure 5c Asymmetric Hyperboloid (One Sheet) Filament Nest 150-C

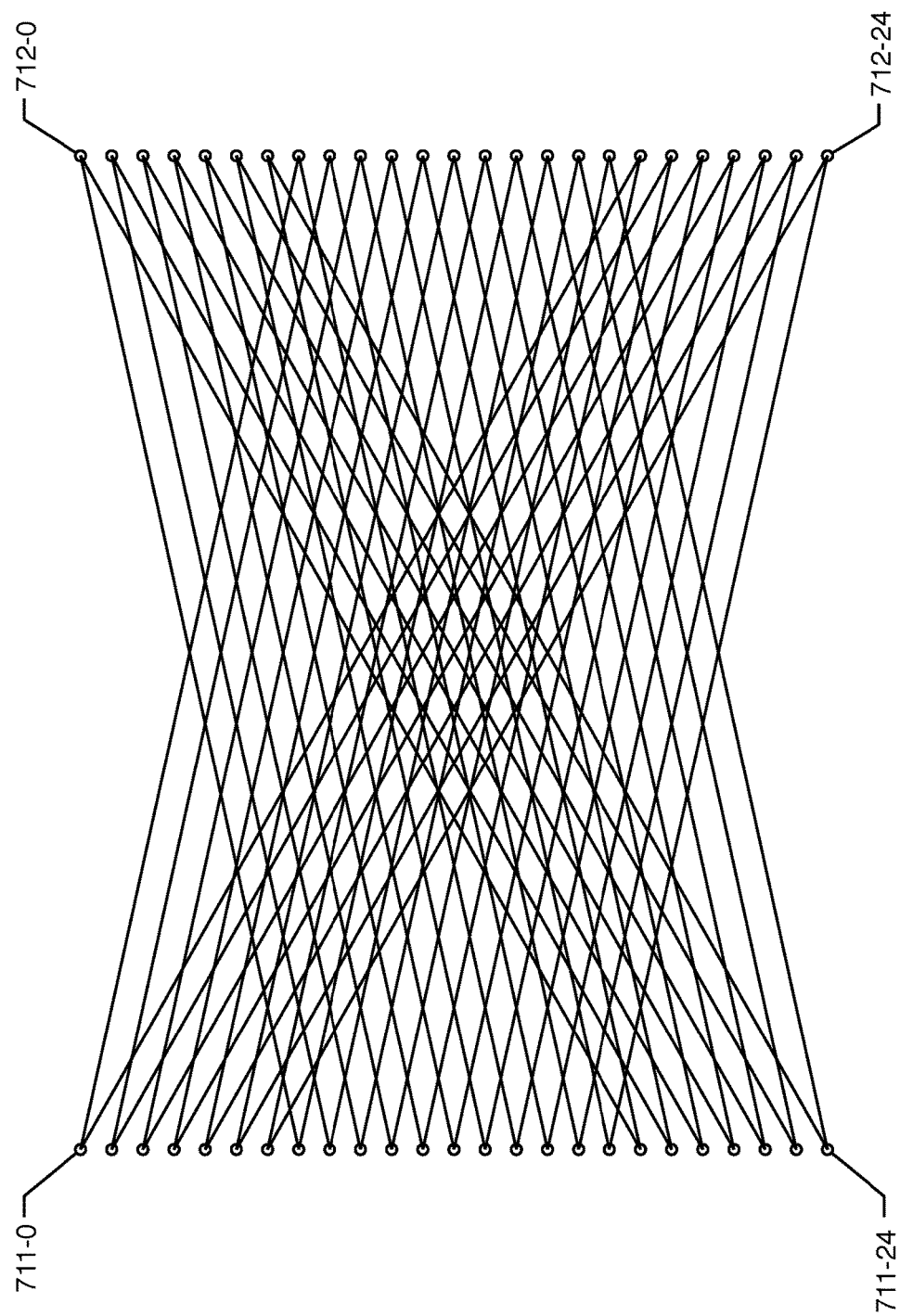

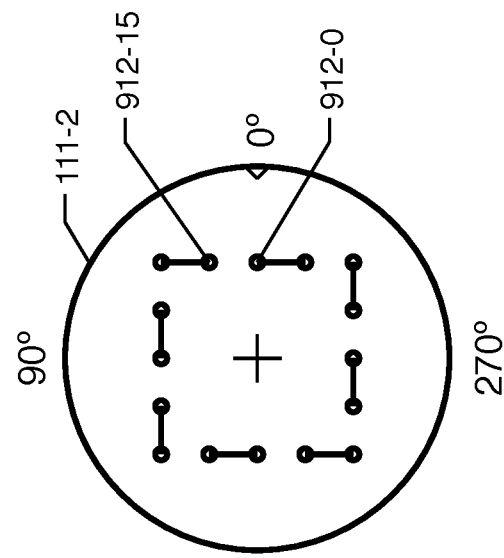
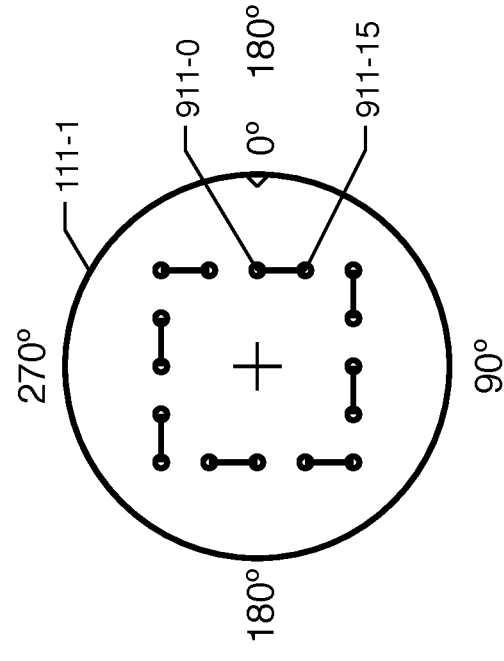
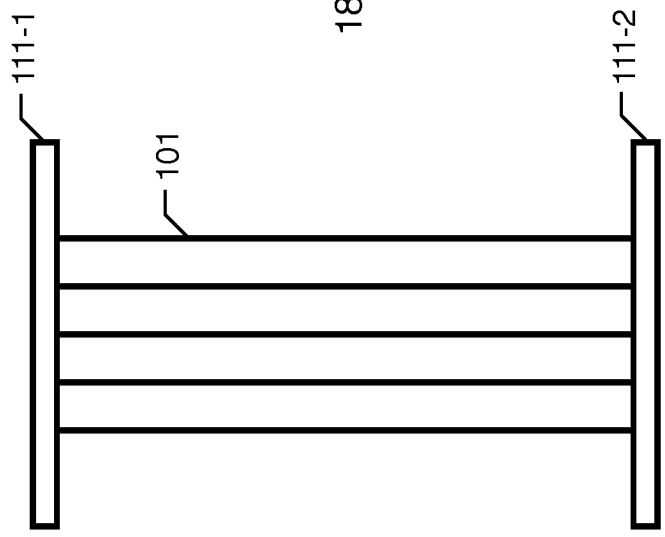
Box Filament Nest 150-D
Figure 9a
Figure 9b
Figure 9c

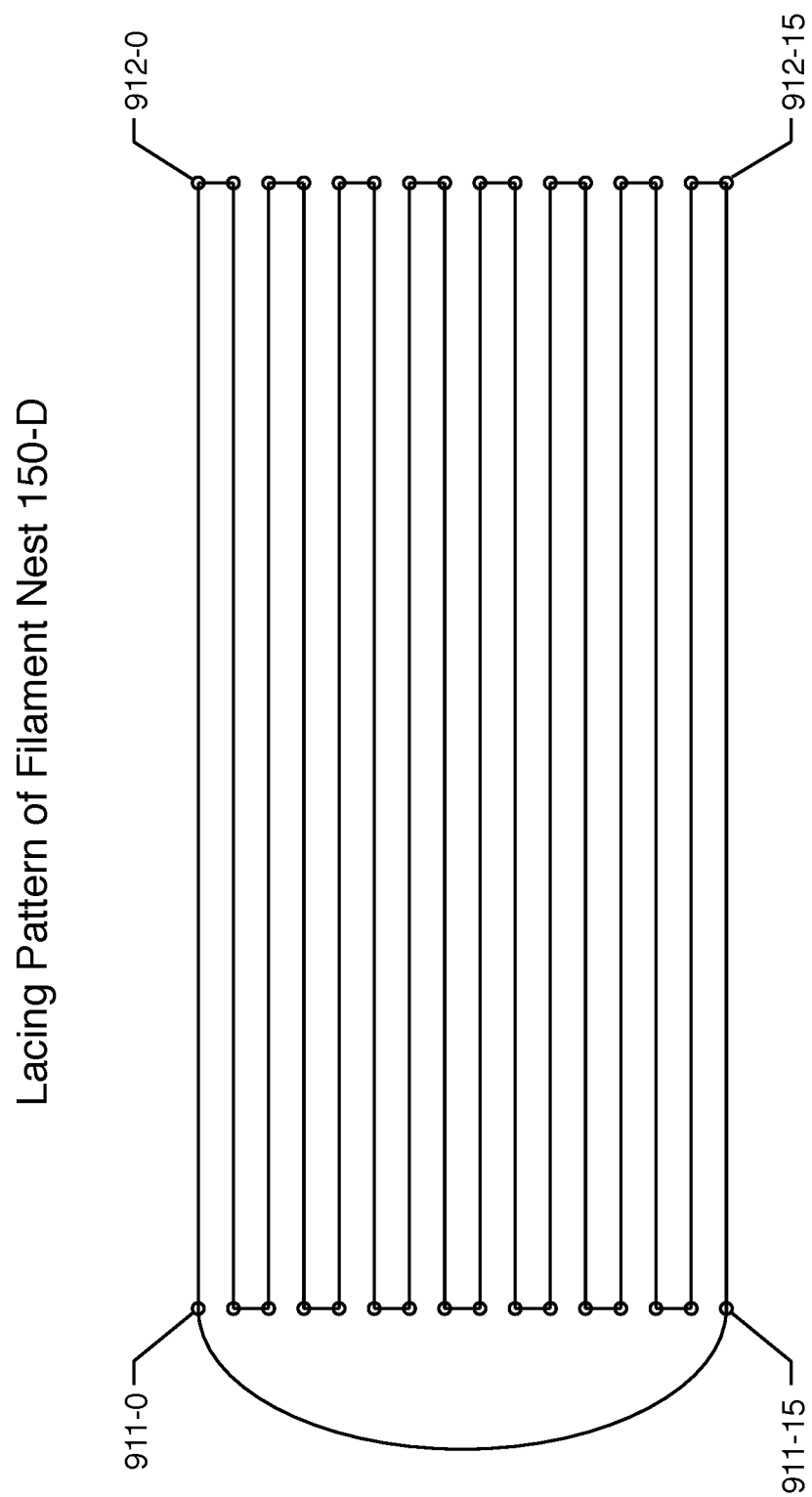

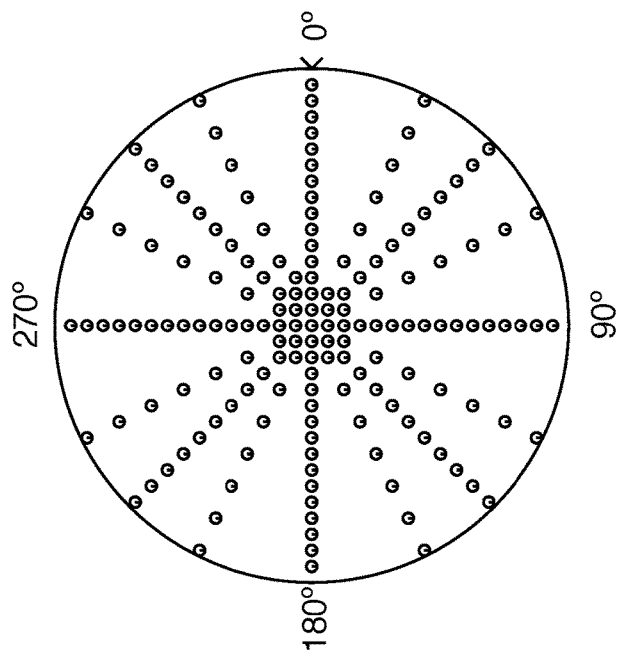
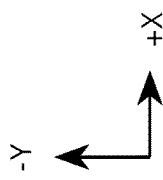
Figure 11

FREE-SPACE 3D PRINTER

FIELD OF THE INVENTION

The present invention relates to additive manufacturing of three-dimensional object in general, and, more particularly, to a technique for fabricating articles of manufacture in free space.

BACKGROUND

Objects are fabricated by using additive techniques or subtractive techniques or a combination of additive and subtractive techniques. Additive techniques involve adding material to a workpiece, and, conversely, subtractive techniques involve removing material from a workpiece. When a sculptor is working with clay and adds bits of clay to the inchoate statue, the sculptor is employing an additive technique, but when the sculptor scrapes away excess clay with a rasp or riffler, the sculptor is employing a subtractive technique.

One class of manufacturing that is colloquially known as "3D printing" and "additive manufacturing" endeavors to fabricate a three-dimensional object from a mathematical model of the object using additive techniques and by avoiding, or minimizing the use of, subtractive techniques.

Perhaps the greatest advantage of additive manufacturing is that it can build an object of any shape. Furthermore, a machine can build an object of any shape without changing any hardware (e.g., molds, dies, mandrels, etc.). To accomplish this, however, there is the constraint that each incremental portion of material must be deposited on:
 (i) the workpiece, which consists of previously deposited portions of material,
 (ii) a build platform, which supports the workpiece, or
 (iii) a scaffold of support material that is temporary and not part of the final object.
In other words, a portion of material cannot be deposited on air.

There are, however, costs and disadvantages associated with traditional additive manufacturing.

SUMMARY OF THE INVENTION

Some embodiments of the present invention enable the additive manufacturing of goods without some of the costs and disadvantages of machines in the prior art. For example, some embodiments of the present invention are able to fabricate articles of manufacture using additive manufacturing techniques without the need for a "build plate" or mandrel. This is advantageous because it enables material to be added to the workpiece at more locations and from more approach angles than 3D printers in the prior art, and also because it prevents the workpiece from sticking or fusing to the build plate.

In accordance with some embodiments of the present invention, a two- or three-dimensional structure made of fiber-reinforced thermoplastic filament is created and suspended between two anchor plates. The structure is called the "filament nest." The workpiece is fabricated by adding material to a portion of filament nest, which provides support for the material and, in some cases, is partially incorporated into the article of manufacture. The size, shape, and structure of the filament nest are tailored to the workpiece.

In accordance with some embodiments of the present invention, the filament nest is constructed from one or more non-empty sets of filaments. When the filament next comprises two or more sets of filaments, one set of filaments can exist wholly within a second set of filaments (i. e., the envelope of the first set of filaments is wholly contained within the envelope of the second set of filaments). Alternatively, one set of filaments can be interwoven with a second set of filaments (i. e., the envelope of the first set of filaments intersects the envelope of the second set of filaments).

In accordance with some embodiments of the present invention, the envelope of a set of filaments is a portion of a quadratic surface (e.g., a cylinder, a hyperboloid of one sheet, a hyperboloid of two sheets, a cone, the frustum of a cone, a paraboloid, the frustum of a paraboloid, etc.).

In accordance with some embodiments of the present invention, the envelope of a set of filaments can be an n-sided pyramid, the frustum of an n-sided pyramid, and an n-sided prism.

For example and without limitation, the envelope of the filament nest can be a cylinder, a box, an n-sided prism, a hyperboloid of one sheet, a cone, the frustum of a cone, a pyramid, and the frustum of a pyramid.

Some or all of the volume of space between the two anchor plates—including the envelope of the filament nest—constitutes the build volume of the illustrative embodiment. After the filament nest is created, the object to be manufactured it constructed using the filament nest as the initial structural support. Sometimes, a portion of the filament nest permanently becomes a part of the object to be manufactured. When the object to be manufactured is finished and can be removed from the illustrative embodiment, the residual portions of the filament nest is cut away from the object and recycled or discarded.

The illustrative embodiment comprises:
a first segment of fiber-reinforced thermoplastic filament $f_0$ that lies along the line $(x(t, 0), y(t, 0), z(t, 0))$ in Cartesian space, wherein:

$$x(t,0) = t(R_1 \cos(\Psi_1) + X_1) + (1-t)(R_2 \cos(\Psi_2) + X_2),$$

$$y(t,0) = t(R_3 \sin(\Psi_1) + Y_1) + (1-t)(R_4 \sin(\Psi_2) + Y_2), \text{ and}$$

$$z(t,0) = t(z_1) + (1-t)(z_2);$$

a second segment of fiber-reinforced thermoplastic filament $f_1$ that lies along the line $(x(t, 1), y(t,1), z(t, 1))$ in Cartesian space, wherein:

$$x(t, 1) = t\left(R_1 \cos\left(\frac{2\pi}{N}\Omega_1 + \Psi_1\right) + X_1\right) + (1-t)\left(R_2 \cos\left(\frac{2\pi}{N}\Omega_2 + \Psi_2\right) + X_2\right),$$

$$y(t, 1) = t\left(R_3 \sin\left(\frac{2\pi}{N}\Omega_1 + \Psi_1\right) + Y_1\right) + (1-t)\left(R_4 \sin\left(\frac{2\pi}{N}\Omega_2 + \Psi_2\right) + Y_2\right),$$

$$\text{and } z(t, 1) = t(z_1) + (1-t)(z_2);$$

a third segment of fiber-reinforced thermoplastic filament $f_n$ that lies along the line $(x(t,n), y(t,n), z(t,n))$ in Cartesian space, wherein:

$$x(t, n) = t\left(R_1 \cos\left(\frac{2\pi n}{N}\Omega_1 + \Psi_1\right) + X_1\right) + (1-t)\left(R_2 \cos\left(\frac{2\pi n}{N}\Omega_2 + \Psi_2\right) + X_2\right),$$

$$y(t, n) = t\left(R_3 \sin\left(\frac{2\pi n}{N}\Omega_1 + \Psi_1\right) + Y_1\right) + (1-t)\left(R_4 \sin\left(\frac{2\pi n}{N}\Omega_2 + \Psi_2\right) + Y_2\right),$$

$$\text{and } z(t, n) = t(z_1) + (1-t)(z_2); \text{ and}$$

a fourth segment of fiber-reinforced thermoplastic filament that is fused to the first segment of fiber-reinforced thermoplastic filament $f_0$ and to the second segment of fiber-reinforced thermoplastic filament $f_1$, and to the third segment of fiber-reinforced thermoplastic filament $f_n$;

wherein N is a positive integer $\geq 3$ and n is a non-negative integer such that $n \in \{0, 1, 2, \ldots, N-1\}$;

wherein $R_1$, $R_2$, $R_3$, $R_4$, $\Omega_1$, $\Omega_2$, $\Psi_1$, $\Psi_2$, $X_1$, $X_2$, $Y_1$, $Y_2$, $z_1$, $z_2$, and t are real numbers; and wherein $R_1 \geq 0$, $R_2 \geq 0$, $R_3 \geq 0$, $R_4 \geq 0$, $R_1+R_2>0$, and $R_3+R_4>0$.

BRIEF DESCRIPTION OF THE DRAWINGS

FIG. 5a depicts an orthographic front view of symmetric hyperboloid (one sheet) filament nest 150-B, in accordance with the second illustrative embodiment of the present invention.

FIG. 5b depicts an orthographic bottom view of anchor plate 111-1 that faces anchor plate 111-2.

FIG. 5c depicts an orthographic top view of anchor plate 111-2 that faces anchor plate 111-1.

FIG. 8 depicts a schematic diagram of the lacing pattern of filament 101 in forming filament nest 150-C.

FIG. 9a depicts an orthographic front view of box filament nest 150-D, in accordance with the fourth illustrative embodiment of the present invention.

FIG. 9b depicts an orthographic bottom view of the side of anchor plate 111-1 that faces anchor plate 111-2.

FIG. 9c depicts an orthographic top view of the side of anchor plate 111-2 that faces anchor plate 111-1.

FIG. 10 depicts a schematic diagram of the lacing pattern of filament 101 in forming filament nest 150-D.

FIG. 11 depicts an orthographic bottom view of an anchor plate in which the filament anchors are arranged in radial spokes.

DETAILED DESCRIPTION

Figure 13:
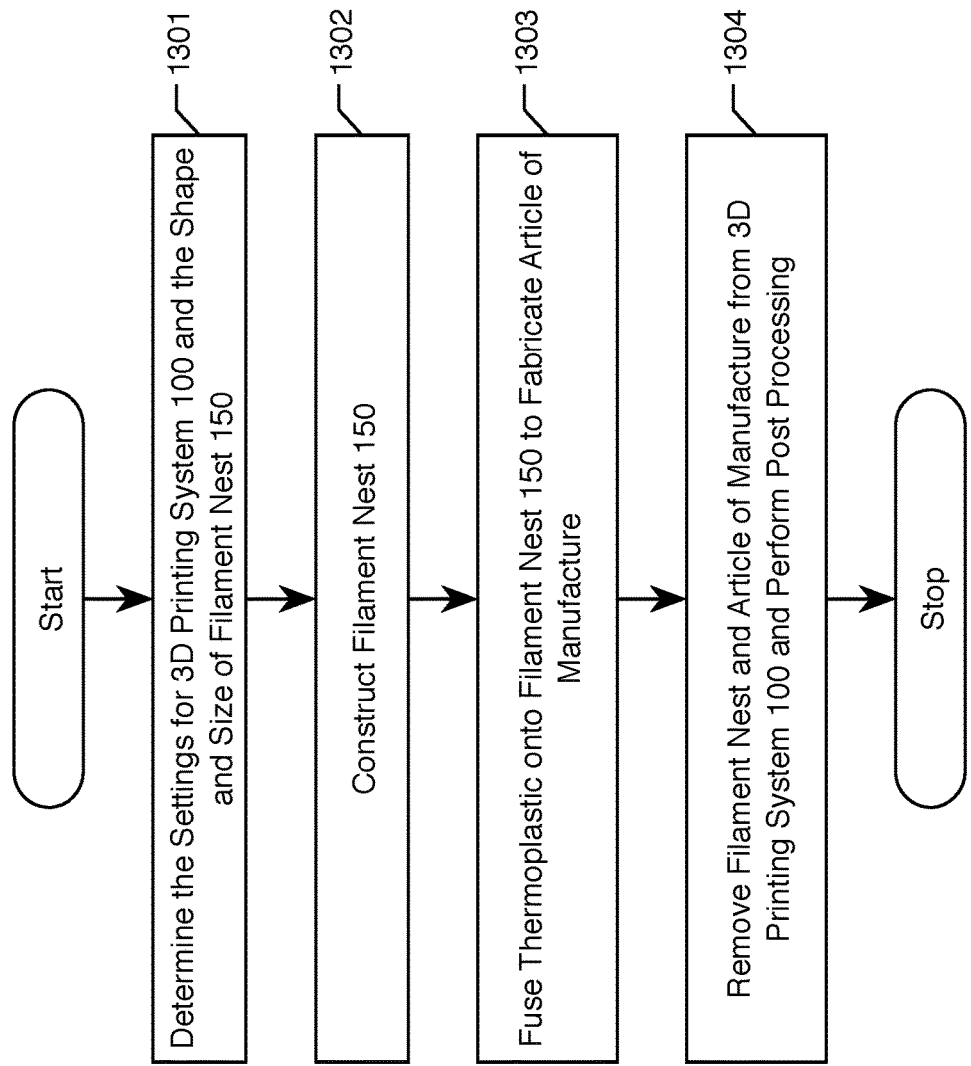
FIG. 13 depicts a flowchart of the salient tasks performed in accordance with the illustrative embodiment of the present invention.

FIG. 13 depicts a flowchart of the salient tasks that are performed in accordance with the illustrative embodiment of the present invention.

At task 1301, a designer of an article of manufacture uses a computer-aided design system (not shown) to determine the settings for 3D printer 100 (shown in FIGS. 1a, 1b, and 1c), the shape and size of filament nest 150 (shown in multiple Figures), and the procedure for fabricating the article of manufacture.

Figure 1A:
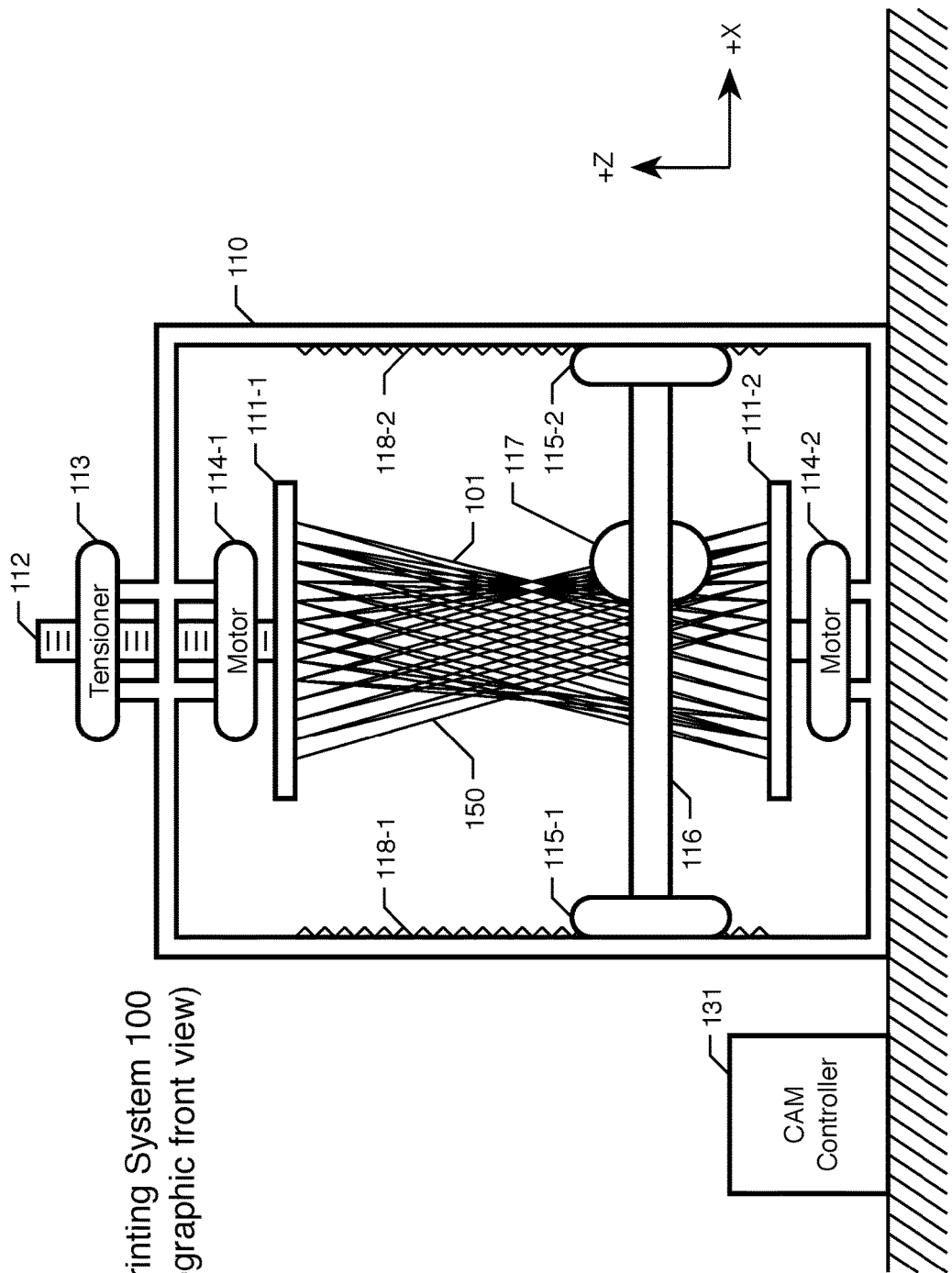
FIG. 1a depicts an orthographic front view of the salient components of 3D printer 100, in accordance with the illustrative embodiment of the present invention.
Figure 1B:
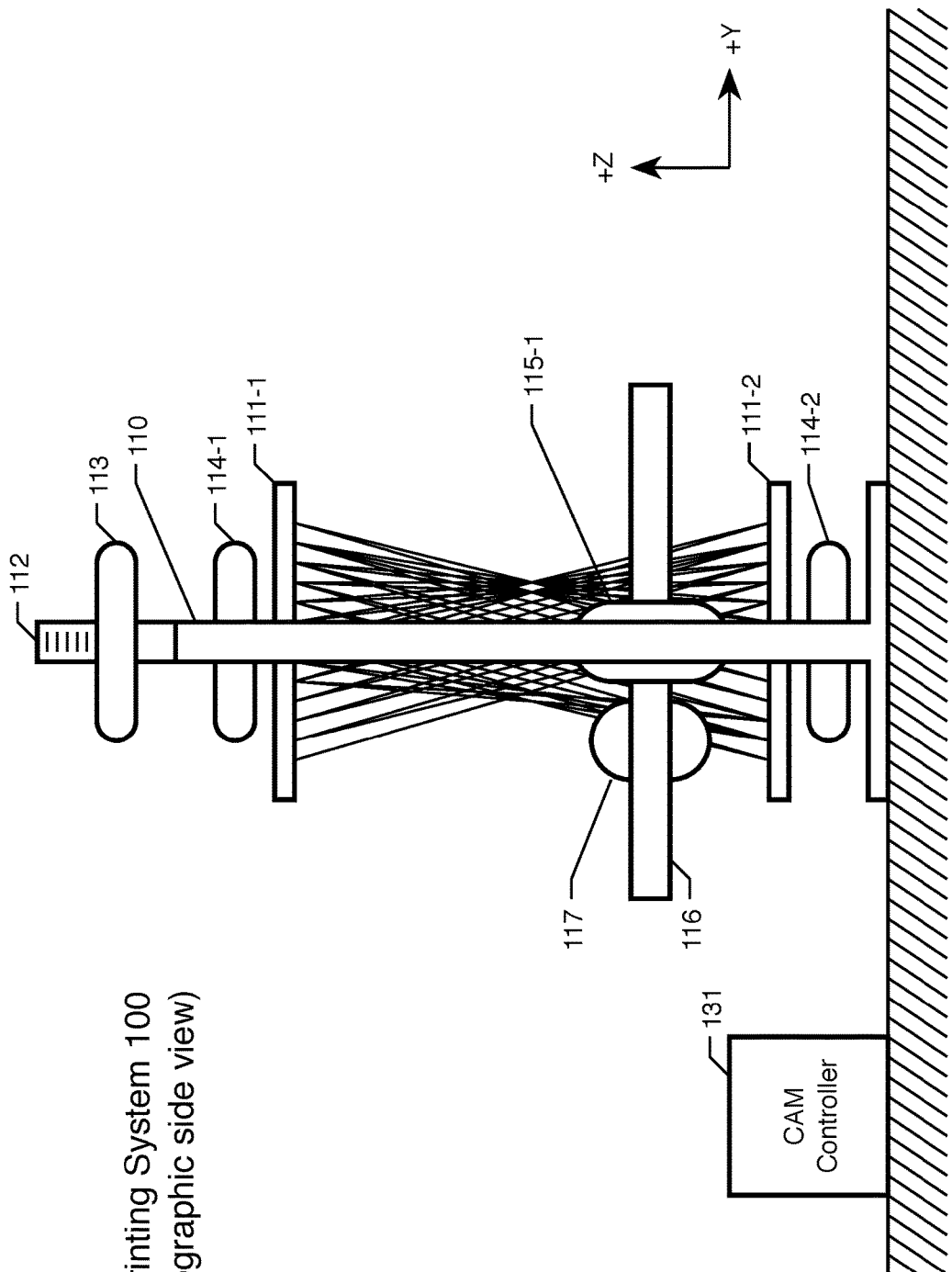
FIG. 1b depicts an orthographic side view of 3D printer 100.
Figure 1C:
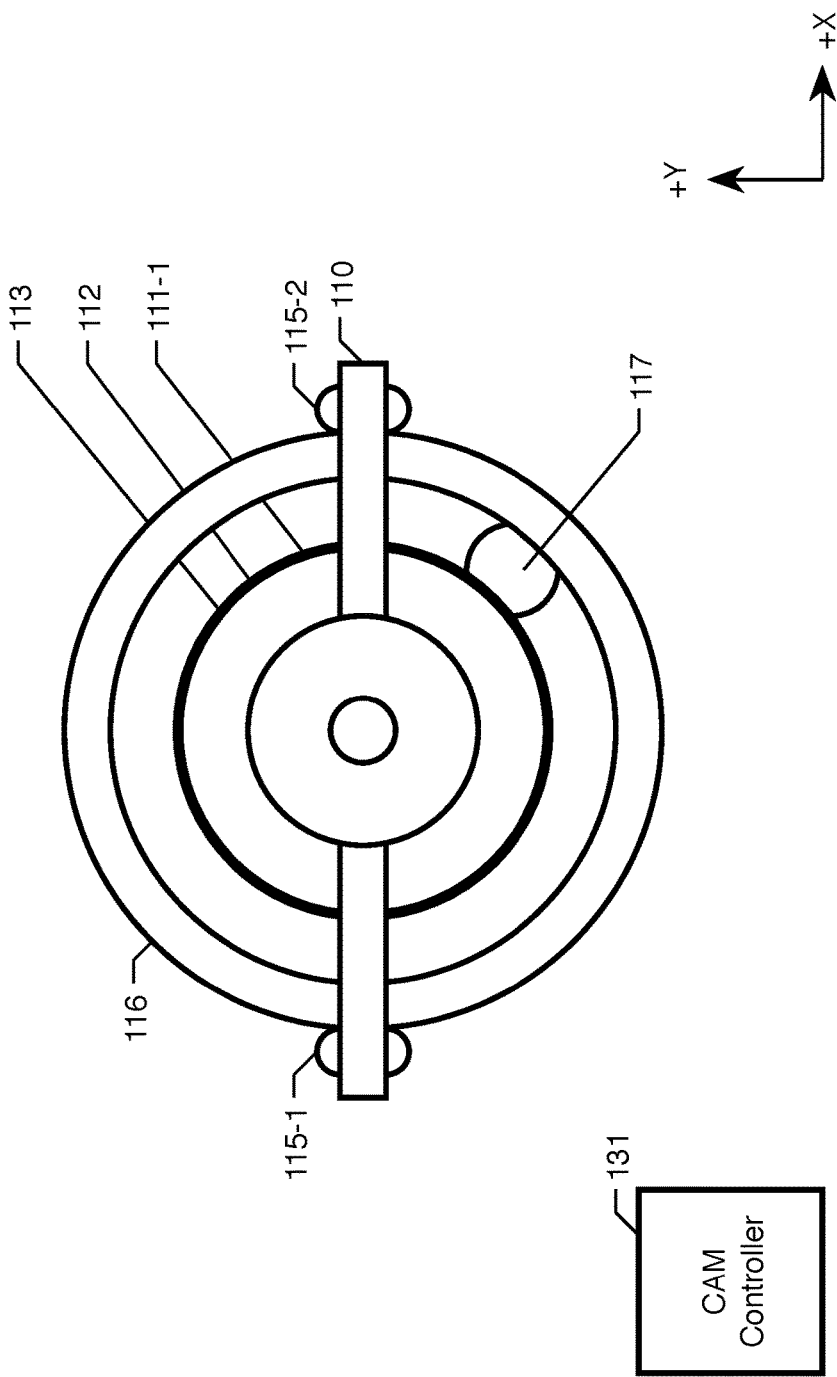
FIG. 1c depicts an orthographic top view of 3D printer 100.

FIG. 1a depicts an orthographic front view of the salient components of 3D printer 100, in accordance with the illustrative embodiment of the present invention. FIG. 1b depicts an orthographic side view of 3D printer 100, and FIG. 1c depicts an orthographic top view of 3D printer 100.

In general, 3D printer 100 is capable of fusing a plurality of segments of filament—of various lengths and in accordance with a specific geometry—into an article of manufacture. Each of these segments is either:

(i) used to provide support for other segments, or
(ii) wholly or partially incorporated into the article of manufacture, or
(iii) both (i) and (ii).

The first segments of filament that are placed in the build volume form a three-dimensional structure called the "filament nest." The primary purpose of the filament nest is to provide support for other segments, although a portion of the filament nest can be incorporated into the article of manufacture. The filament nest is a critical component in the fabrication of the article of manufacture, and the size, shape, and lacing pattern of four illustrative filament nests is described in detail below and in the accompanying figures.

3D printer 100 comprises: chassis 110, anchor plates 111-1 and 111-2, anchor plate rod 112, anchor-frame tensioner 113, anchor-frame motors 114-1 and 114-2, trolleys 115-1 and 115-2, orbital track 116, filament deposition head 117, rack gear 118-1 and 118-2, and CAM controller 131. Also shown in the figures is filament 101 and filament nest 150.

Filament 101 comprises a cylindrical towpreg of continuous 12K carbon fiber impregnated with thermoplastic resin.

It will be clear to those skilled in the art, after reading this disclosure, how to make and use alternative embodiments of the present invention in which filament 101 comprises chopped fibers. It will be clear to those skilled in the art, after reading this disclosure, how to make and use alternative embodiments of the present invention in which filament 101 comprises a different number of fibers (e.g., 1K, 3K, 6K, 24K, etc.). It will be clear to those skilled in the art, after reading this disclosure, how to make and use alternative embodiments of the present invention in which the fibers in filament 101 are made of a different material (e.g., fiberglass, aramid, carbon nanotubes, etc.).

In accordance with the illustrative embodiment, the thermoplastic is, in general, a semi-crystalline polymer and, in particular, the polyaryletherketone (PAEK) known as polyetherketone (PEK). In accordance with some alternative embodiments of the present invention, the semi-crystalline material is the polyaryletherketone (PAEK), polyetheretherketone (PEEK), polyetherketoneketone (PEKK), polyetheretherketoneketone (PEEKK), or polyetherketoneetherketoneketone (PEKEKK).

In accordance with some alternative embodiments of the present invention, the semi-crystalline polymer is not a polyaryletherketone (PAEK) but another semi-crystalline thermoplastic (e.g., polyamide (PA), polybutylene terephthalate (PBT), polyp-phenylene sulfide) (PPS), etc.) or a mixture of a semi-crystalline polymer and an amorphous polymer.

When the filament comprises a blend of an amorphous polymer with a semi-crystalline polymer, the semi-crystalline polymer can one of the aforementioned materials and the amorphous polymer can be a polyarylsulfone, such as polysulfone (PSU), polyethersulfone (PESU), polyphenylsulfone (PPSU), polyethersulfone (PES), or polyetherimide (PEI). In some additional embodiments, the amorphous polymer can be, for example and without limitation, polyphenylene oxides (PPOs), acrylonitrile butadiene styrene (ABS), methyl methacrylate acrylonitrile butadiene styrene copolymer (ABSi), polystyrene (PS), or polycarbonate (PC).

When the filament comprises a blend of an amorphous polymer with a semi-crystalline polymer, the weight ratio of semi-crystalline material to amorphous material can be in the range of about 50:50 to about 95:05, inclusive, or about 50:50 to about 90:10, inclusive. Preferably, the weight ratio of semi-crystalline material to amorphous material in the blend is between 60:40 and 80:20, inclusive. The ratio selected for any particular application may vary primarily as a function of the materials used and the properties desired for the printed object.

In some alternative embodiment of the present invention, the filament comprises a metal. For example, and without limitation, the filament can be a wire comprising stainless steel, inconel (nickel/chrome), titanium, aluminum, cobalt chrome, copper, bronze, iron, precious metals (e.g., platinum, gold, silver, etc.). In accordance with the illustrative embodiment, when the fabrication of an article of manufacture is complete, residual portions of the filament nest are cut away from the object and discarded or recycled. In these cases, a portion of the filament nest becomes permanently embedded in the article of manufacture. It will be clear to those skilled in the art, however, after reading this disclosure, how to make and use alternative embodiments of the present invention in which all of the filament nest is removed from the article of manufacture after fabrication is complete.

Referring again to FIGS. 1a, 1b, and 1c, chassis 110 is a rigid structure that holds the components of system 100 in the desired spatial relationship. It will be clear to those skilled in the art, after reading this disclosure, how to make and use chassis 110.

Figure 2A:
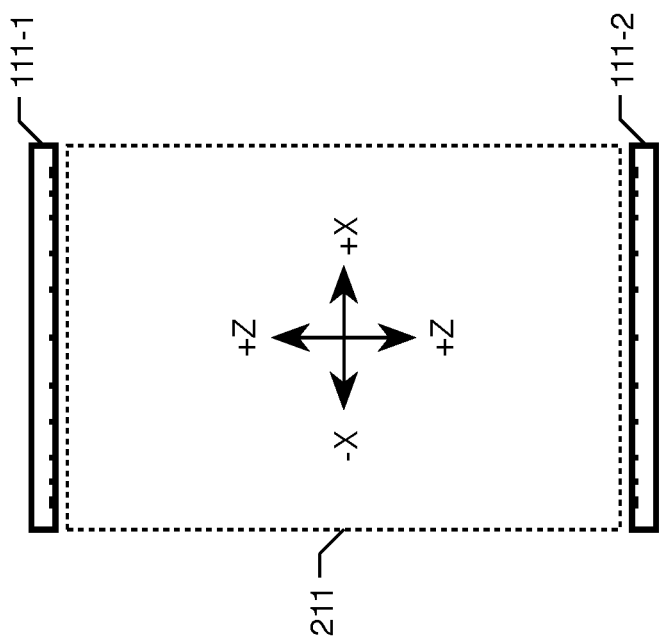
FIG. 2a depicts an orthographic front view of anchor plates 111-1 and 111-2 and the volume of space between anchor plates 111-1 and 111-2.
Figure 2B:
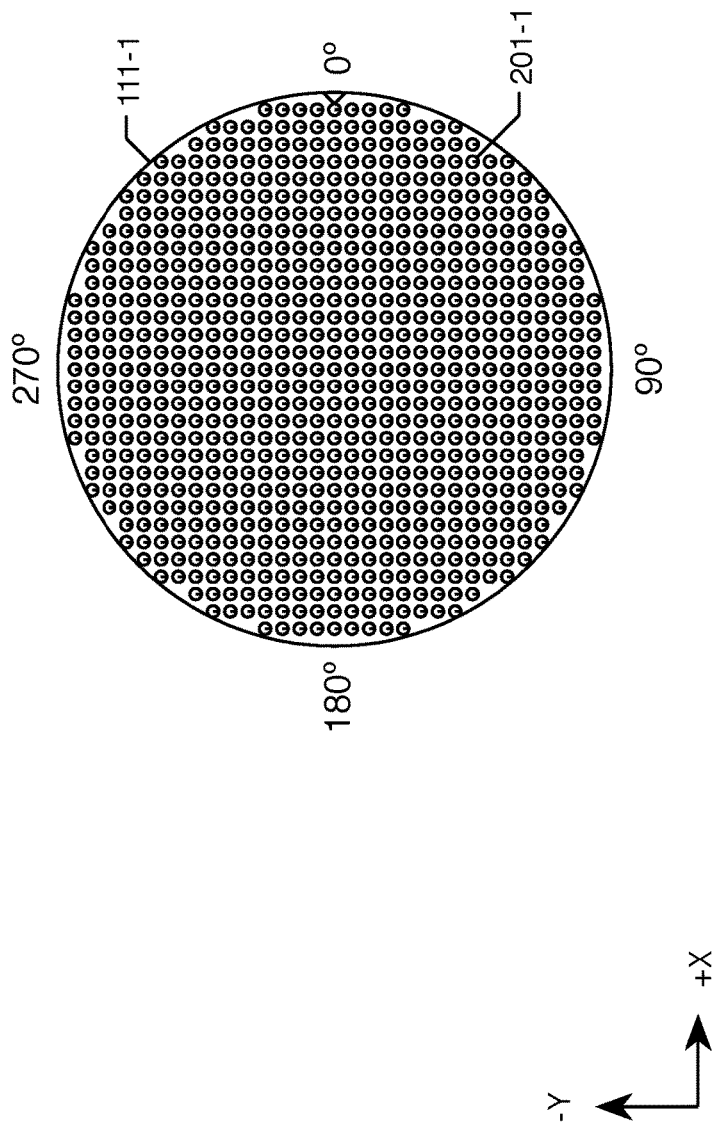
FIG. 2b depicts an orthographic bottom view of anchor plate 111-1, which comprises 577 filament anchors arranged in symmetrical two-dimensional array 201-1.
Figure 2C:
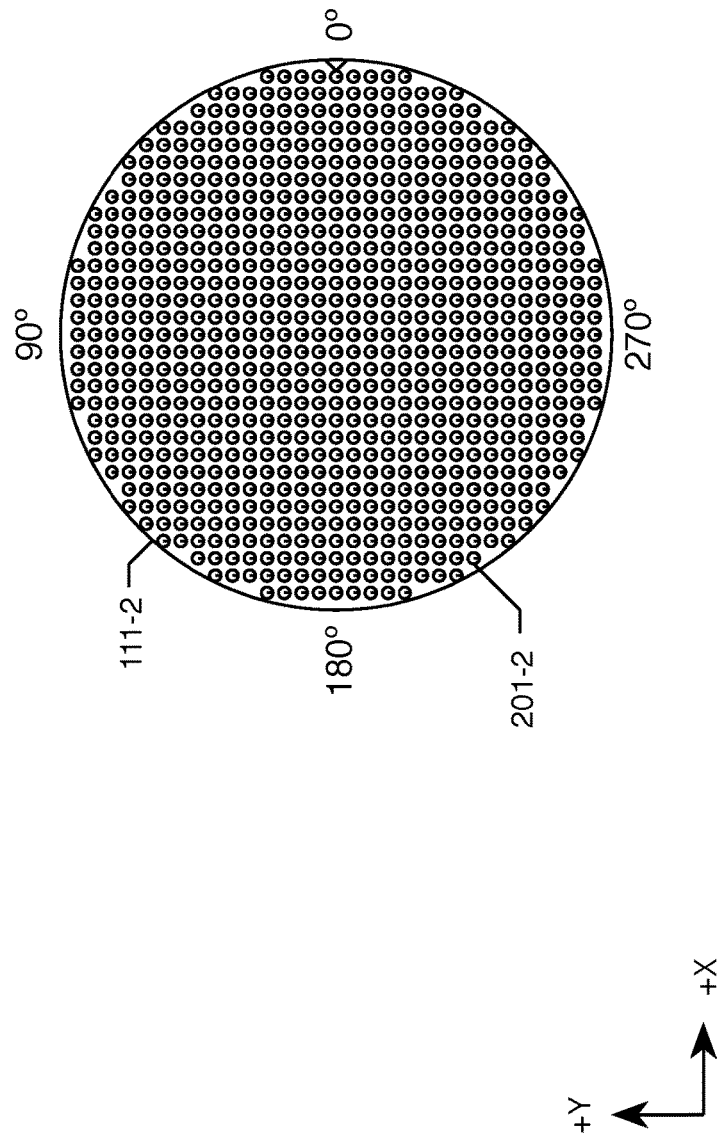
FIG. 2c depicts an orthographic top view of anchor plate 111-2, which comprises 577 filament anchors arranged in symmetrical two-dimensional array 201-2.

Anchor plate 111-1 is a cylindrical metal plate that comprises a plurality of spatially-disparate filament anchors (shown in FIG. 2b), and anchor plate 111-2 is a cylindrical metal plate that comprises a plurality of spatially-disparate filament anchors (shown in FIG. 2c). Together, anchor plate 111-1 and anchor plate 111-2 hold filament 101 under tension to form filament nest 150. The space between anchor plates 111-1 and 111-2 constitutes build volume 211 (shown in FIG. 2a) of 3D printer system 100. Anchor plates 111-1 and 111-2 are described in detail below and in the accompanying figures.

Anchor plate rod 112 is a rod that is affixed to anchor plate 111-1 and that is used—in conjunction with anchor-frame tensioner 113—to affect the tension of filament 101 and—in conjunction with motor 114-1—to turn anchor plate 111-1 (and, consequently, one end of the filament nest with it) around the z-axis. It will be clear to those skilled in the art, after reading this disclosure, how to make and use anchor plate rod 112.

Anchor plate tensioner 113 comprises the actuators and electronics to move anchor plate rod 112 in the +Z and −Z directions, under the control of CAM controller 131, and to affect the desired tension on filament 101. It will be clear to those skilled in the art, after reading this disclosure, how to make and use anchor plate tensioner 113.

Anchor-frame motor 114-1 comprises the actuators and electronics to turn anchor plate 111-1 clockwise and counter-clockwise around the Z-axis (and, consequently, the end of the filament nest anchored to it) any number of degrees, under the control of CAM controller 131. Similarly, anchor-frame motor 114-2 comprises the actuators and electronics to turn anchor plate 111-2 clockwise and counter-clockwise around the Z-axis (and, consequently, the end of the filament nest anchored to it) any number of degrees, under the control of CAM controller 131.

Anchor plates 111-1 and 111-2 can be turned synchronously and/or independently. There are three reasons why it is advantageous to be able to turn anchor plates 111-1 and 111-2 synchronous and/or independently. First, anchor plates 111-1 and 111-2 can be turned independently as one method for affecting the tension of filament 101. Second, anchor plates 111-1 and 111-2 can be turned independently to affect the shape of the filament nest. Third, anchor plates 111-1 and 111-2 can be turned synchronously to facilitate the spatial relationship of the deposition tip of filament deposition head 117 to the filament nest and the workpiece. It will be clear to those skilled in the art how to make and use motor 114-1 and motor 114-2.

Trolleys 115-1 and 115-2 respectively comprise the actuators and electronics to support and move orbital track 116 (and, consequently, filament deposition head 117) along gear rack 118-1 and 118-2 in the +Z and −Z direction, any distance, at any rate of travel, under the control of CAM controller 131. It will be clear to those skilled in the art, after reading this disclosure, how to make and use trolleys 115-1 and 115-2.

Orbital track 116 is a ringed-shaped track that surrounds build volume 211 of system 100 at a point on the Z-axis. Furthermore, orbital track 116 comprises the actuators and electronics necessary to move filament deposition head 117 clockwise and counter-clockwise around the Z-axis. Together, trolleys 115-1 and 115-2 and orbital track 116 enable filament deposition head 117 to be access any point in build volume 211 from any approach angle.

Filament deposition head 117 comprises the actuators and electronics to move the deposition tip (not shown in FIG. 1a, 1b, or 1c) radially so that the deposition tip can:
  (i) loop filament 101 around any filament anchor on anchor plates 111-1 and 111-2, and
  (ii) deposit one or more segments of filament 101 of any length at any location in build volume 211 (using the previously strung portions of filament 101 as structural support), and
  (iii) fuse two or more portions of segments at any location in build volume 211. Filament deposition head 117 also comprises a spool for holding filament 101 (not shown in FIG. 1a, 1b, or 1c). It will be clear to those skilled in the art, after reading this disclosure, how to make and use filament deposition head 117.

Gear rack 118-1 and 118-2 are affixed to chassis 110 and provide trolleys 118-1 and 118-2 with positive traction and positioning. It will be clear to those skilled in the art how to make and use gear rack 118-1 and 118-2.

CAM controller 131 is a computer and associated electronics that is capable of controlling system 100 to fabricate an object. It will be clear to those skilled in the art how to make and use CAM controller 131.

FIG. 2a depicts an orthographic front view of anchor plate 111-1, build volume 211, and anchor plate 111-2. For the purposes of this specification, the center of build volume 211 is the origin of the coordinate system, but it will be clear to those skilled in the art, after reading this disclosure, how to make and use alternative embodiments of the present invention in which another point in space is the origin.

FIG. 2b depicts an orthographic bottom view of anchor plate 111-1, which comprises 577 filament anchors arranged in a symmetrical two-dimensional array 201-1, and FIG. 2c depicts an orthographic top view of anchor plate 111-2, which comprises 577 filament anchors arranged in a symmetrical two-dimensional array 201-2.

Figure 12:
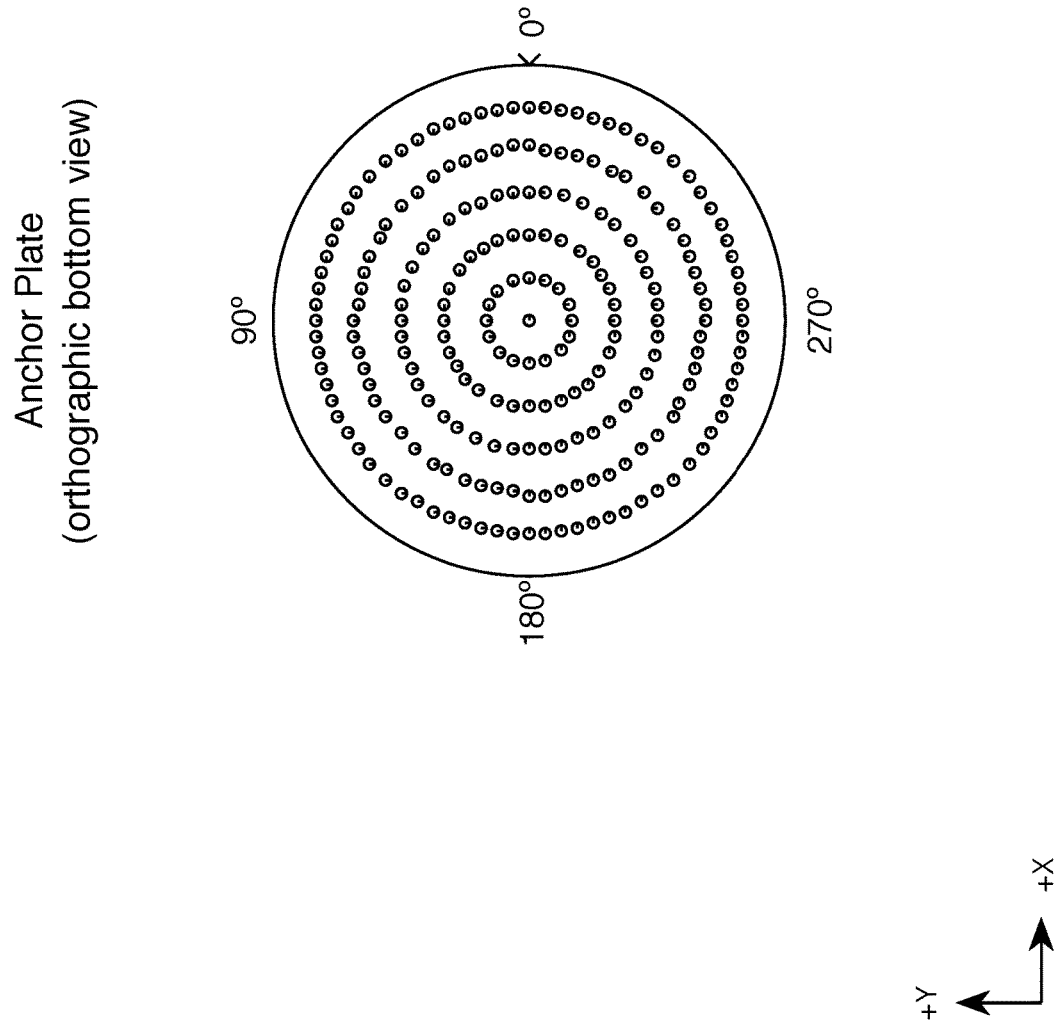
FIG. 12 depicts an orthographic bottom view of an anchor plate in which the filament anchors are arranged in concentric circles.

In accordance with the illustrative embodiment, the filament anchors are arranged in rows in columns, but it will be clear to those skilled in the art, after reading this disclosure, how to make and use alternative embodiments of the present invention in which the filament anchors are arranged in another pattern (e.g., radial spokes as shown in FIG. 11, concentric circles as shown in FIG. 12, etc.).

In accordance with the illustrative embodiment, each anchor plate comprises five-hundred and seventy-seven (577) filament anchors, but it will be clear to those skilled in the art, after reading this disclosure, how to make and use alternative embodiments of the present invention that comprise any number of filament anchors on each anchor plate. It will be clear to those skilled in the art that a large number of filament anchors—carefully placed—provides many possible anchoring points, and, therefore, a great deal of flexibility in choosing the size and shape of the filament nest.

In accordance with the illustrative embodiment, each filament anchor comprises: (i) an orifice in the anchor plate through which the beginning and end of filament 101 can be threaded and terminated, and (ii) a hook onto which deposition head 117 can loop filament 101. It will be clear to those skilled in the art, after reading this disclosure, how to make and use alternative embodiments of the present invention in which a filament anchor holds filament 101 with a different mechanism (e.g., pinchers, adhesive contact, etc.).

At task 1302, filament nest 150 is constructed for use as the support for the article of manufacture.

Figure 3A:
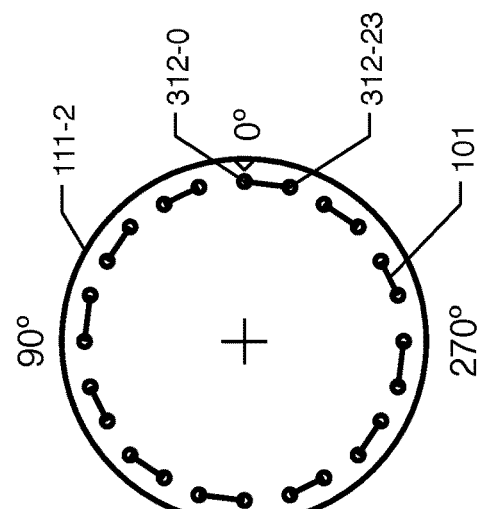
FIG. 3a depicts an orthographic front view of cylindrical filament nest 150-A, in accordance with the first illustrative embodiment of the present invention.

FIG. 3a depicts an orthographic front view of cylindrical filament nest 150-A, in accordance with the first illustrative embodiment of the present invention. As shown in FIG. 3a, anchor plates 111-1 and 111-2 are kept apart by chassis 110 (not shown in FIG. 3a) and hold filament 101 under tension to form a filament nest whose envelope has the shape of a cylinder of radius $R_1$. The lacing of cylindrical filament nest 150-A is described in detail below and in FIGS. 3b, 3c, and 4.

Figure 3B:
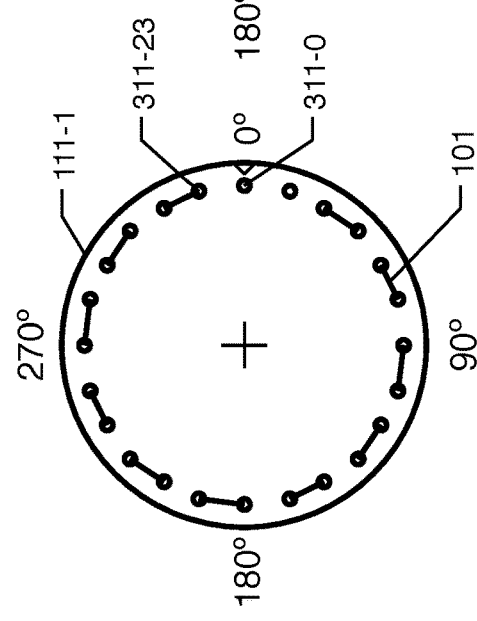
FIG. 3b depicts an orthographic bottom view of anchor plate 111-1, which faces anchor plate 111-2.
Figure 3C:
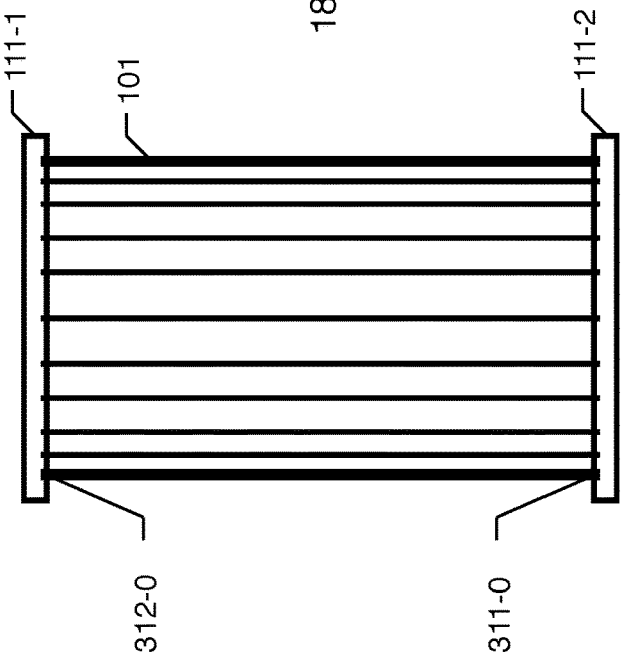
FIG. 3c depicts an orthographic top view of anchor plate 111-2, which faces anchor plate 111-1.
Figure 4:
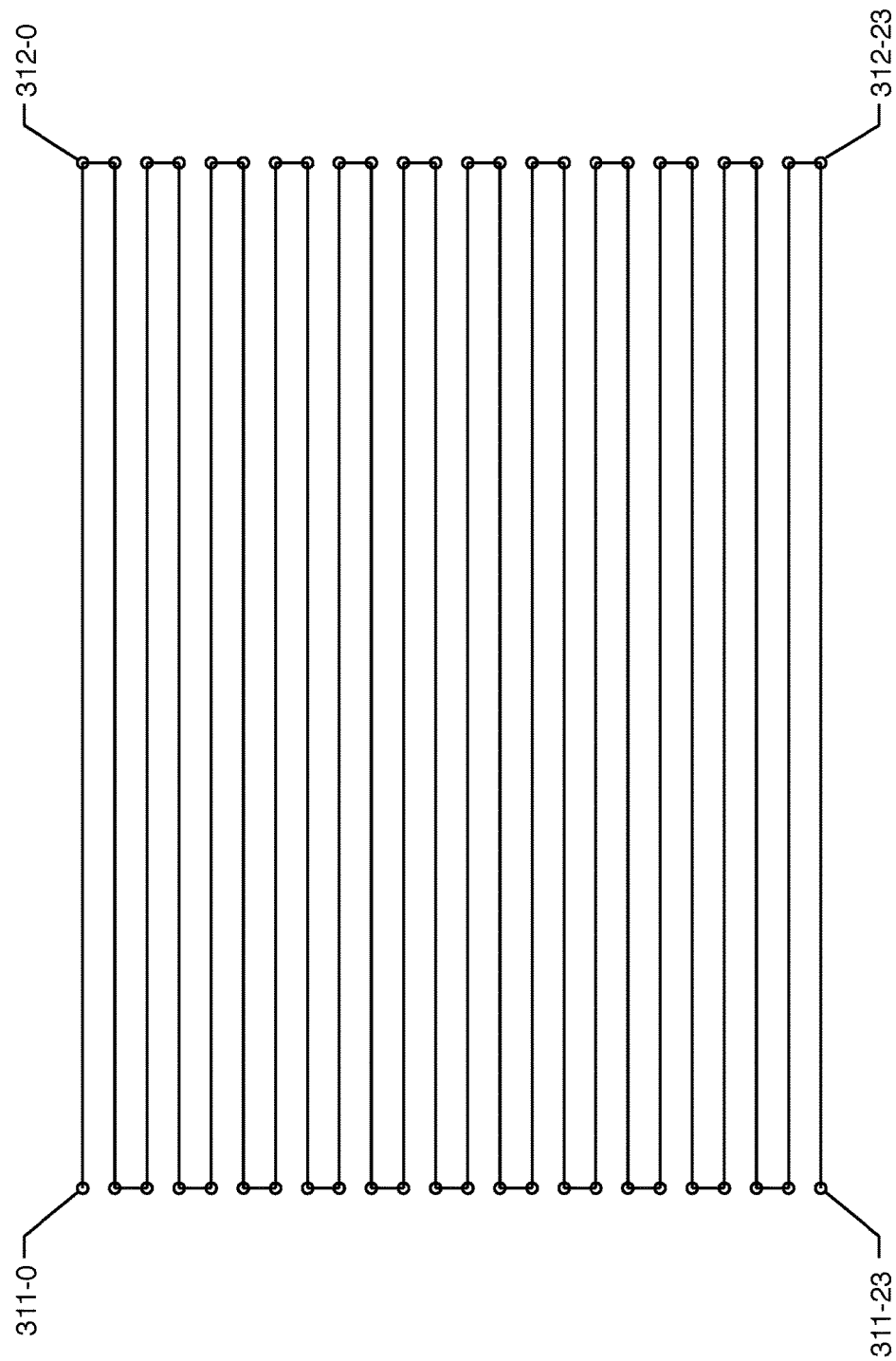
FIG. 4 depicts a schematic diagram of the lacing pattern of filament 101 in forming cylindrical filament nest 150-A.

FIG. 3b depicts an orthographic bottom view of anchor plate 111-1, which faces anchor plate 111-2. FIG. 3c depicts an orthographic top view of anchor plate 111-2, which faces anchor plate 111-1. FIG. 4 depicts a schematic diagram of the lacing pattern of filament 101 in forming cylindrical filament nest 150-A.

FIG. 3b depicts 24 of the 577 filament anchors on anchor plate 111-1, which are arranged in a circle, spaced approximately $360°/24 = 15°$ apart, at radius $R_1$. The twenty-four filament anchors are labeled 311-0 through 311-23.

FIG. 3c depicts 24 of the 577 filament anchors on anchor plate 111-2, which are arranged in a circle, spaced approximately $360°/24 = 15°$ apart, at radius $R_1$. The twenty-four filament anchors are labeled 312-0 through 312-23.

Because anchor-frame motor 114-1 can turn independently of anchor-frame motor 114-2, filament anchor 311-$i$ is not always directly above filament anchor 312-$i$, however. When filament anchor 311-$i$ is not directly above filament anchor 312-$i$, and when filament 101 is laced in accordance with the pattern in FIG. 4, then the envelope of filament nest 150-A forms a hyperboloid of one sheet.

Although cylindrical filament nest 150-A comprises 24 filament anchors on anchor plate 111-1 and 111-2, it will be clear to those skilled in the art, after reading this disclosure, that a cylindrical filament nest can be made using any number of filament anchors.

Although the circle comprising the filament anchors on anchor plate 111-1 has the same radius as the circle comprising the filament anchors on anchor plate 111-2, it will be clear to those skilled in the art, after reading this disclosure, how to make and use alternative embodiments of the present invention that have a different radius, in which case the envelope of the filament nest will form the frustum of a cone.

Cylindrical filament nest 150-A comprises filament 101 laced among filament anchors 311-0 through 311-23 and filament anchors 312-0 through 312-23 as shown in FIG. 4.

In FIG. 4, the twenty-four filament anchors 311-0 through 311-23 are schematically represented as circles in descending order on the left side of the diagram, and filament anchors 312-1 through 312-23 are schematically represented as circles in descending order on the right side of the diagram. A line connecting two circles indicates that filament 101 is directly laced directly from one filament anchor to the second filament anchor. For example, the line in FIG. 4 from filament anchor 311-1 to filament anchor 312-1 indicates that filament 101 traverses from filament anchor 311-1 to filament anchor 312-1. This is an example of a filament traversal from one filament anchor on one anchor plate to a filament anchor on a second anchor plate.

In contrast, the line in FIG. 4 from filament anchor 312-0 to filament anchor 312-1 indicates that filament 101 traverses from filament anchor 312-0 to filament anchor 312-1. This is an example of a filament traversal from one filament anchor on one anchor plate to a second filament anchor on the same anchor plate.

One end of filament 101 is terminated at filament anchor 311-0 and the other end of filament 101 is terminated at filament anchor 311-23. Filament 101 can be terminated and laced either by deposition head 117 or by hand. The combination of the number and location of the filament anchors on anchor plates 111-1 and 111-2 plus the lacing pattern depicted in FIG. 4 results in a filament nest whose envelope is a cylinder.

It will be clear to those skilled in the art, after reading this disclosure, how to make and use cylindrical filament nest of any length and radius and comprising any number of turns of filament 101.

Each filament nest comprises N segments of filament 101 that each traverse build volume 211 from anchor plate 111-1 to anchor plate 111-2, or vice versa. The N segments are labeled $f_0, f_1, f_2, \ldots f_n, \ldots f_{N-2}, f_{N-1}$, wherein N is a positive integer $\geq 3$ and n is a non-negative integer such that $n \in \{0, 1, 2, \ldots, N-1\}$.

All or a portion of segment $f_n$ lies along the parametrically-defined line (x(t,n), y(t,n), z(t,n)) in Cartesian space, wherein:

$$x(t, n) = t\left(R_1 \cos\left(\frac{2\pi n}{N}\Omega_1 + \Psi_1\right) + X_1\right) +$$
$$(1 - t)\left(R_2 \cos\left(\frac{2\pi n}{N}\Omega_2 + \Psi_2\right) + X_2\right) \quad \text{(Eq. 1x)}$$

$$y(t, n) = t\left(R_3 \sin\left(\frac{2\pi n}{N}\Omega_1 + \Psi_1\right) + Y_1\right) +$$
$$(1 - t)\left(R_4 \sin\left(\frac{2\pi n}{N}\Omega_2 + \Psi_2\right) + Y_2\right) \quad \text{(Eq. 1y)}$$

$$z(t, n) = t(z_1) + (1 - t)(z_2) \quad \text{(Eq. 1z)}$$

wherein $R_1$, $R_2$, $R_3$, $R_4$, $\Omega_1$, $\Omega_2$, $\Psi_1$, $\Psi_2$, $X_1$, $X_2$, $Y_1$, $Y_2$, $z_1$, $z_2$, and t are real numbers, and wherein $R_1 \geq 0$, $R_2 \geq 0$, $R_3 \geq 0$, $R_4 \geq 0$.

The values of $R_1$ and $R_2$ specify the size and shape of filament nest 150 at anchor plate 111-1. When $R_1 = R_2$, $R_1 > 0$, and $R_2 > 0$, then filament nest 150 forms a circle at anchor plate 111-1. When $R_1 \neq R_2$, $R_1 > 0$, and $R_2 > 0$, then filament nest 150 forms an ellipse at anchor plate 111-1. When $R_1 = 0$, and $R_2 = 0$, then filament nest 150 forms a point at anchor plate 111-1. When $R_1 > 0$, and $R_2 = 0$, then filament nest 150 forms a line at anchor plate 111-1.

Similarly, the values of $R_3$ and $R_4$ specify the size and shape of filament nest 150 at anchor plate 111-2. When $R_3 = R_4$, $R_3 > 0$, and $R_4 > 0$, then filament nest 150 forms a circle at anchor plate 111-2. When $R_3 \neq R_4$, $R_3 > 0$, and $R_4 > 0$, then filament nest 150 forms an ellipse at anchor plate 111-2. When $R_3 = 0$, and $R_4 = 0$, then filament nest 150 forms a point at anchor plate 111-2. When $R_3 > 0$, and $R_4 = 0$, then filament nest 150 forms a line at anchor plate 111-2.

The envelope of filament nest 150 is non-zero whenever $R_1 \geq 0$, $R_2 \geq 0$, $R_3 \geq 0$, $R_4 \geq 0$, $R_1 + R_2 > 0$, and $R_3 + R_4 > 0$.

The values of $\Omega_1$ and $\Omega_1$ specify the rate at which filament 101 advances around the anchors at anchor plate 111-1 and 111-2, respectively. In accordance with the illustrative embodiments, $\Omega_1 = \Omega_2 = 1$, but it will be clear to those skilled in the art, after reading this disclosure, how to make and use alternative embodiments of the present invention for any values of $\Omega_1$ and $\Omega_1$ (e.g., $\Omega_1 \neq \Omega_2$, etc.).

The values of $\Psi_1$ and $\Psi_1$ specify the phase shift with which filament 101 advances around the anchors at anchor plate 111-1 and 111-2, respectively. In filament nests 150-A and 150-D, $\Psi_1 = \Psi_2$, but in filament nests 150-B and 150-C, $\Psi_1 \neq \Psi_2$. It will be clear to those skilled in the art, after reading this disclosure, how to make and use alternative embodiments of the present invention for any values of $\Psi_1$ and $\Psi_1$.

The center of filament nests 150-A, 150-B, 150-C, and 150-D are on the Z-axis at both anchor plates 111-1 and 111-2, but it will be clear to those skilled in the art, after reading this disclosure, how to make and use alternative embodiments of the present invention in which a filament nest is offset at one or both of anchor plates 111-1 and 111-2. The values of $X_1$ and $Y_1$ specify the offset at anchor plate 111-1, and, in accordance with the illustrative embodiments $X_1 = 0$ and $Y_1 = 0$. The values of $X_2$ and $Y_2$ specify the offset at anchor plate 111-2, and, in accordance with the illustrative embodiments $X_2 = 0$ and $Y_2 = 0$. It will be clear to those skilled in the art, after reading this disclosure, how to make and use alternative embodiments of the present invention for any values of $X_1$, $X_2$, $Y_1$, and $Y_2$.

The value of $z_1$ is the coordinate of anchor plate 111-1 and the value of $z_2$ is the coordinate of anchor plate 111-2.

In filament nests 150-A and 150-D segment $f_n$ is not fused to any other segment. In contrast, in filament nests 150-B and 150-C, segment $f_n$ is fused—at some location within build volume 211—to segment $f_{n+K \, (mod \, N)}$, wherein K is a positive integer.

Figure 6:
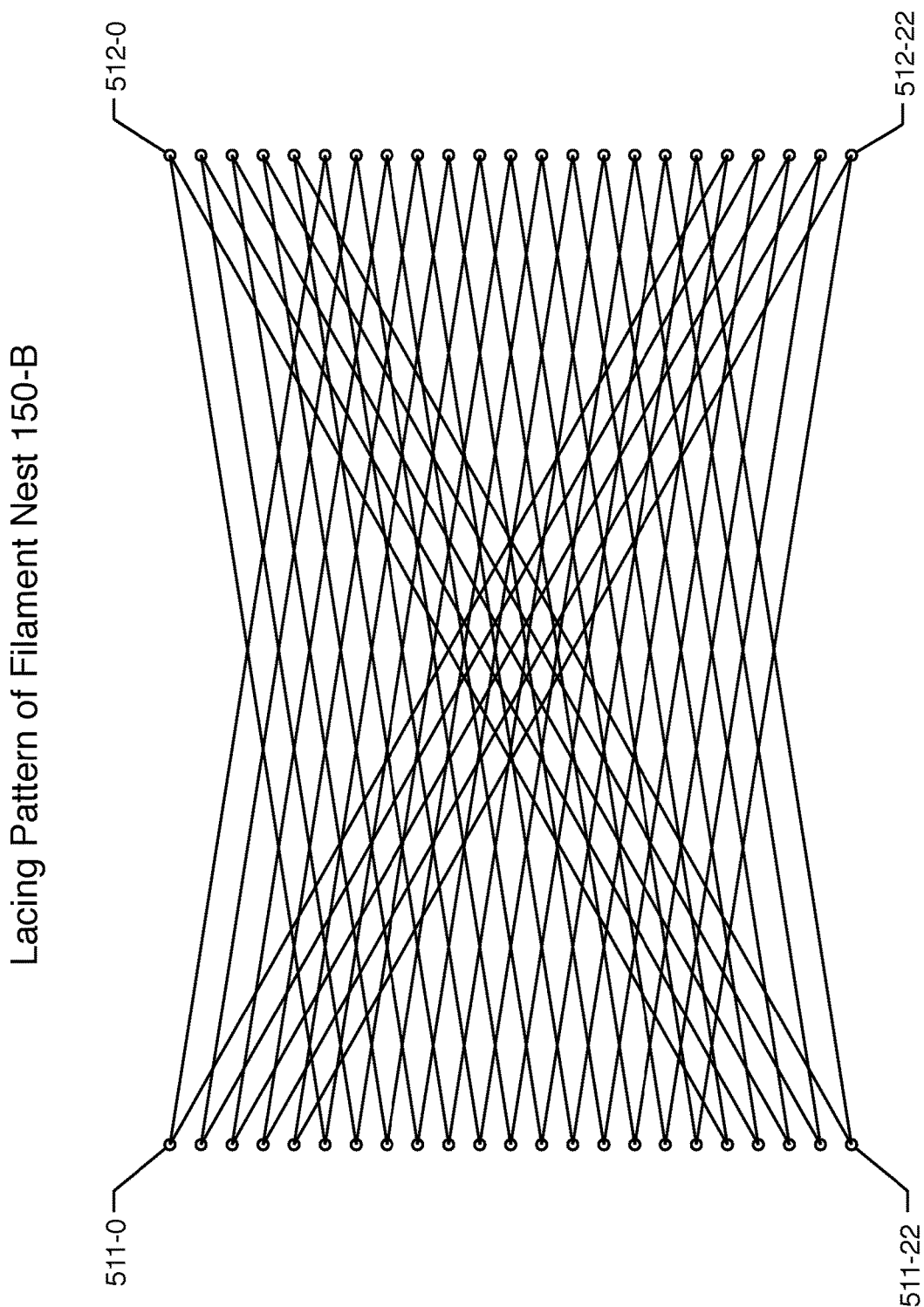
FIG. 6 depicts a schematic diagram of the lacing pattern of filament 101 in forming filament nest 150-B.

FIG. 5a depicts an orthographic front view of symmetric hyperboloid (one sheet) filament nest 150-B, in accordance with the second illustrative embodiment of the present invention. As shown in FIG. 5a, anchor plates 111-1 and 111-2 are kept apart by chassis (not shown in FIG. 5a) and hold filament 101 under tension to form a filament nest whose envelope has the shape of a symmetric hyperboloid of one sheet. The lacing of filament nest 150-B is described in detail below and in FIGS. 5b, 5c, and 6. FIG. 5b depicts an orthographic bottom view of anchor plate 111-1 that faces anchor plate 111-2. FIG. 5c depicts an orthographic top view of anchor plate 111-2 that faces anchor plate 111-1. FIG. 6 depicts a schematic diagram of the lacing pattern of filament 101 in forming filament nest 150-B.

FIG. 5b depicts 23 of the 577 filament anchors on anchor plate 111-1 arranged in a circle, spaced approximately $$\frac{360°}{23} \approx 15.65° \text{ apart,}$$

at radius $R_2$. The twenty-three filament anchors are labeled 511-0 through 511-22. FIG. 5c depicts 23 of the 577 filament anchors on anchor plate 111-2 arranged in a circle, spaced approximately $$\frac{360°}{23} \approx 15.65° \text{ apart,}$$

at radius $R_2$. The twenty-three filament anchors are labeled 512-0 through 512-22.

Filament nest 150-B comprises filament 101 laced among filament anchors 511-0 through 511-22 and filament anchors 512-0 through 512-22 as shown in FIG. 6. Both ends of filament 101 are terminated at filament anchor 511-0. To form filament nest 150-B, filament 101 is looped, iteratively, from filament anchor 511-$a$ to filament anchor 512-$b$ and from filament anchor 512-$b$ to filament anchor 511-$c$, wherein:

$$b = (a+e) \text{ modulo } f \quad \text{(Eq. 2a)}$$

and $$c = (b+e) \text{ modulo } f \quad \text{(Eq. 2b)}$$

wherein a, b, and c are non-negative integers in the range $0 \leq a, b, c < f$, wherein f is an odd positive integer equal to the number of laced filament anchors in each circle, and wherein e is a positive integer such that $e < f$ and $\gcd(e,f) = 1$ (i. e., e and f are relatively prime, $e \perp f$). In filament nest 150-B, $e = 5$ and $f = 23$.

Filament 101 can be terminated and laced either by deposition head 117 or by hand. The combination of the number and location of the filament anchors on anchor plates 111-1 and 111-2 plus the lacing pattern depicted in FIG. 6 results in a filament nest whose envelope is a symmetric hyperboloid of one sheet. Although filament nest 150-B comprises 24 filament anchors on anchor plate 111-1 and 111-2, it will be clear to those skilled in the art, after reading this disclosure, that a hyperboloid (one sheet) filament nest can be made using any number of filament anchors.

It will be clear to those skilled in the art, after reading this disclosure, how to describe the segments of filament nest 150-B in terms of Equations 1x, 1y, and 1z.

Figure 7A:
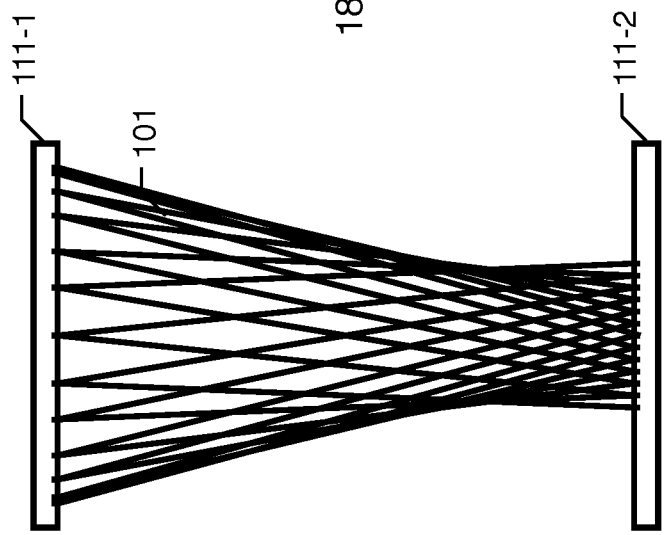
FIG. 7a depicts an orthographic front view of asymmetric hyperboloid (one sheet) filament nest 150-C, in accordance with the third illustrative embodiment of the present invention.
Figure 7B:
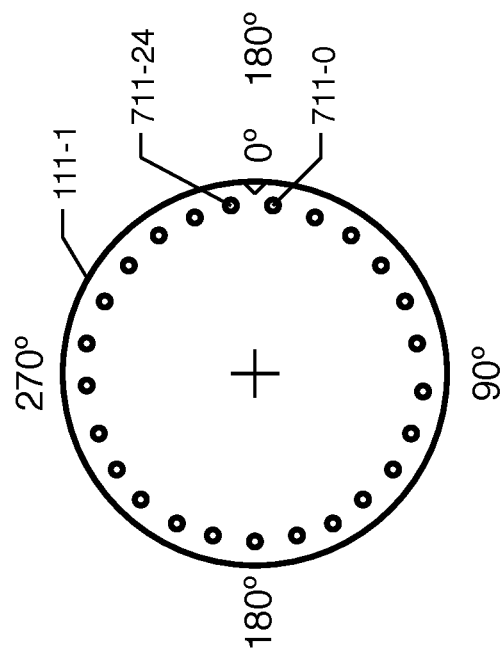
FIG. 7b depicts an orthographic bottom view of anchor plate 111-1 that faces anchor plate 111-2.
Figure 7C:
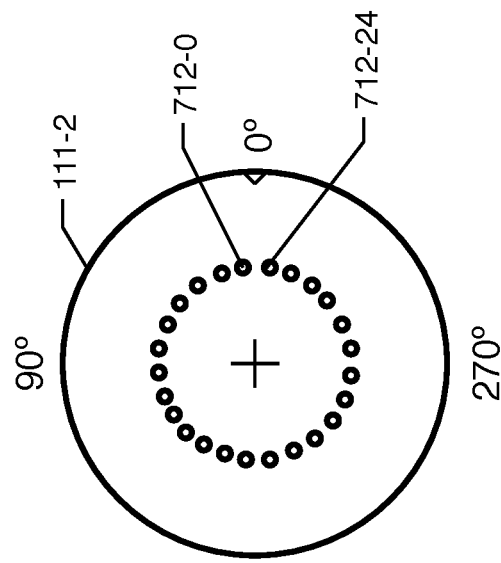
FIG. 7c depicts an orthographic top view of anchor plate 111-2 that faces anchor plate 111-1.

FIG. 7a depicts an orthographic front view of asymmetric hyperboloid (one sheet) filament nest 150-C, in accordance with the third illustrative embodiment of the present invention. As shown in FIG. 7a, anchor plates 111-1 and 111-2 are kept apart by chassis (not shown in FIG. 7a) and hold filament 101 under tension to form a filament nest whose envelope has the shape of an asymmetric hyperboloid of one sheet. The lacing of filament nest 150-C is described in detail below and in FIGS. 7b, 7c, and 8. FIG. 7b depicts an orthographic bottom view of anchor plate 111-1 that faces anchor plate 111-2. FIG. 7c depicts an orthographic top view of anchor plate 111-2 that faces anchor plate 111-1. FIG. 8 depicts a schematic diagram of the lacing pattern of filament 101 in forming filament nest 150-C.

FIG. 7b depicts 25 of the 577 filament anchors on anchor plate 111-1 arranged in a circle, spaced approximately $$\frac{360°}{25} = 14.4° \text{ apart,}$$

at radius $R_3$. The twenty-five filament anchors are labeled 711-0 through 711-24. FIG. 7c depicts 25 of the 577 filament anchors on anchor plate 111-2 arranged in a circle, spaced approximately $$\frac{360°}{25} \approx 14.4° \text{ apart,}$$

at radius $R_4$, wherein $R_3 > R_4$. The twenty-five filament anchors are labeled 712-0 through 712-24.

Filament nest 150-C comprises filament 101 laced among filament anchors 711-0 through 711-24 and filament anchors 712-0 through 712-24 as shown in FIG. 8. Both ends of filament 101 are terminated at filament anchor 711-0. To form filament nest 150-C, filament 101 is looped, iteratively, from filament anchor 711-$a$ to filament anchor 712-$b$ and from filament anchor 712-$b$ to filament anchor 711-$c$, wherein:

$$b = (a+e) \bmod f \quad \text{(Eq. 2a)}$$

and $$c = (b+e) \bmod f \quad \text{(Eq. 2b)}$$

wherein a, b, and c are non-negative integers in the range 0≤a, b, c<f, wherein f is an odd positive integer equal to the number of laced filament anchors in each circle, and wherein e is a positive integer such that e<f and gcd(e,f)=1 (i. e., e and f are relatively prime, e ⊥f). In filament nest 150-C, e=7 and f=25.

Filament 101 can be terminated and laced either by deposition head 117 or by hand. The combination of the number and location of the filament anchors on anchor plates 111-1 and 111-2 plus the lacing pattern depicted in FIG. 8 results in a filament nest whose envelope is an symmetric hyperboloid of one sheet. Although filament nest 150-C comprises 25 filament anchors on anchor plate 111-1 and 111-2, it will be clear to those skilled in the art, after reading this disclosure, that a hyperboloid (one sheet) filament nest can be made using any number of filament anchors.

It will be clear to those skilled in the art, after reading this disclosure, how to describe the segments of filament nest 150-C in terms of Equations 1x, 1y, and 1z.

FIG. 9a depicts an orthographic front view of box filament nest 150-D, in accordance with the fourth illustrative embodiment of the present invention. As shown in FIG. 9a, anchor plates 111-1 and 111-2 are kept apart by chassis (not shown in FIG. 9a) and hold filament 101 under tension to form a filament nest whose envelope has the shape of a box. The lacing of filament nest 150-D is described in detail below and in FIGS. 9b, 9c, and 10. FIG. 9b depicts an orthographic bottom view of the side of anchor plate 111-1 that faces anchor plate 111-2. FIG. 9c depicts an orthographic top view of the side of anchor plate 111-2 that faces anchor plate 111-1. FIG. 10 depicts a schematic diagram of the lacing pattern of filament 101 in forming filament nest 150-D.

FIG. 9b depicts 16 of the 577 filament anchors on anchor plate 111-1 arranged in a square of diagonal $D_1$.

Filament nest 150-D comprises filament 101 laced among filament anchors 911-0 through 911-15 and filament anchors 912-0 through 912-15 as shown in FIG. 10. Both ends of filament 101 are terminated at filament anchor 911-0. Filament 101 can be terminated and laced either by deposition head 117 or by hand. The combination of the number and location of the filament anchors on anchor plates 111-1 and 111-2 plus the lacing pattern depicted in FIG. 10 results in a filament nest whose envelope is a box. Although filament nest 150-C comprises 16 filament anchors on anchor plate 111-1 and 111-2, it will be clear to those skilled in the art, after reading this disclosure, that a box filament nest can be made using any number of filament anchors.

It will be clear to those skilled in the art, after reading this disclosure, how to describe the segments of filament nest 150-D in terms of Equations 1x, 1y, and 1z.

At task 1303, 3D printer 100 fuses additional segments of fiber-reinforced thermoplastic filament to filament nest 150 to form the article of manufacture. It will be clear to those skilled in the art, after reading this disclosure, how to make and use a 3D printer that performs task 1303.

At task 1304, filament nest 150 and the article of manufacture which are fabricated in task 1303 are removed from 3D printer 100 for post-processing. In accordance with the illustrative embodiment, task 1304 includes, but is not limited to:
  (i) cutting the residual portions of filament nest 150 that are not permanently incorporated into the article of manufacture away from the article of manufacture,
  (ii) sanding the surface of the article of manufacture,
  (iii) drilling and/or tapping the article of manufacture, and
  (iv) priming and/or painting the article of manufacture.

It will be clear to those skilled in the art, after reading this disclosure, how to make and use a 3D printer that performs task 1304.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A machine comprising:
   a first anchor plate that comprises f filament anchors labeled p(1,0) through p(1, f−1), wherein f is an odd positive integer;
   a second anchor plate that comprises f filament anchors labeled p(2,0) through p(2, f−1);
   a filament nest comprising a fiber-reinforced filament that is laced from filament anchor p(1,a) to filament anchor p(2,b) to filament anchor p(1,c); and
   a deposition head configured to move between the first anchor plate and the second anchor plate, and to lace the fiber-reinforced filament from the first anchor plate to the second anchor plate to the first anchor plate;
   wherein $b = (a+e) \bmod f$ and $c = (b+e) \bmod f$;

wherein a, b, and c are non-negative integers in the range $0 \leq a, b, c < f$; and
   wherein e is a positive integer such that e<f and e and f are relatively prime.

2. The machine of claim 1 further comprising a chassis for maintaining the relative spatial position of the first anchor plate relative to the second anchor plate and the fiber-reinforced filament under tension.

3. The machine of claim 1 further comprising a motor connected to the first anchor plate for varying the relative angular orientation of the first anchor plate to the second anchor plate.

4. The machine of claim 1 further comprising a tensioner connected to the chassis for controlling the tension of a filament looped between a filament anchor on the first anchor plate and a filament anchor on the second anchor plate.

5. The machine of claim 1 wherein the f filament anchors on the first anchor plate are arranged in a circle, spaced approximately $$\frac{360°}{f}$$

degrees apart, at radius $R_1$; and
   wherein the f filament anchors on the second anchor plate are arranged in a circle, spaced approximately $$\frac{360°}{f}$$

degrees apart, at radius $R_1$.

6. The machine of claim 1 wherein the f filament anchors on the first anchor plate are arranged in a circle, spaced approximately $$\frac{360°}{f}$$

degrees apart, at radius $R_1$; and
   wherein the f filament anchors on the second anchor plate are arranged in a circle, spaced approximately $$\frac{360°}{f}$$

degrees apart, at radius $R_2$; and
   wherein $R_1 < R_2$.

7. The machine of claim 1 wherein the f filament anchors on the first anchor plate are arranged in a square having a diagonal of $D_1$; and
   wherein the f filament anchors on the second anchor plate are arranged in a square having a diagonal of $D_1$.

8. The machine of claim 1 wherein the f filament anchors on the first anchor plate are arranged in a square having a diagonal of $D_1$; and
   wherein the f filament anchors on the second anchor plate are arranged in a square having a diagonal of $D_2$; and
   wherein $D_1 < D_2$.

9. The machine of claim 1 wherein filament anchor p(2,b) comprises a hook, and wherein the deposition head is further configured to loop the fiber-reinforced filament onto the hook.

10. The machine of claim 1 wherein the fiber-reinforced filament of the filament nest is further laced from filament anchor p(1,c) on the first anchor plate to filament anchor p(2,d) on the second anchor plate, wherein d=(c+e) modulo f.

* * * * *